(No Model.) 3 Sheets—Sheet 1.

H. BAUM.
SAFETY DEVICE FOR ELEVATORS.

No. 604,557. Patented May 24, 1898.

Witnesses: Wm. B. Snowhook, Erwin J. Lotz

Inventor: Heinrich Baum
By Rudolph Wm. Lotz, Attorney

THE NORRIS PETERS CO., PHOTO-LITHO., WASHINGTON, D. C.

(No Model.)  3 Sheets—Sheet 2.
H. BAUM.
SAFETY DEVICE FOR ELEVATORS.
No. 604,557. Patented May 24, 1898.
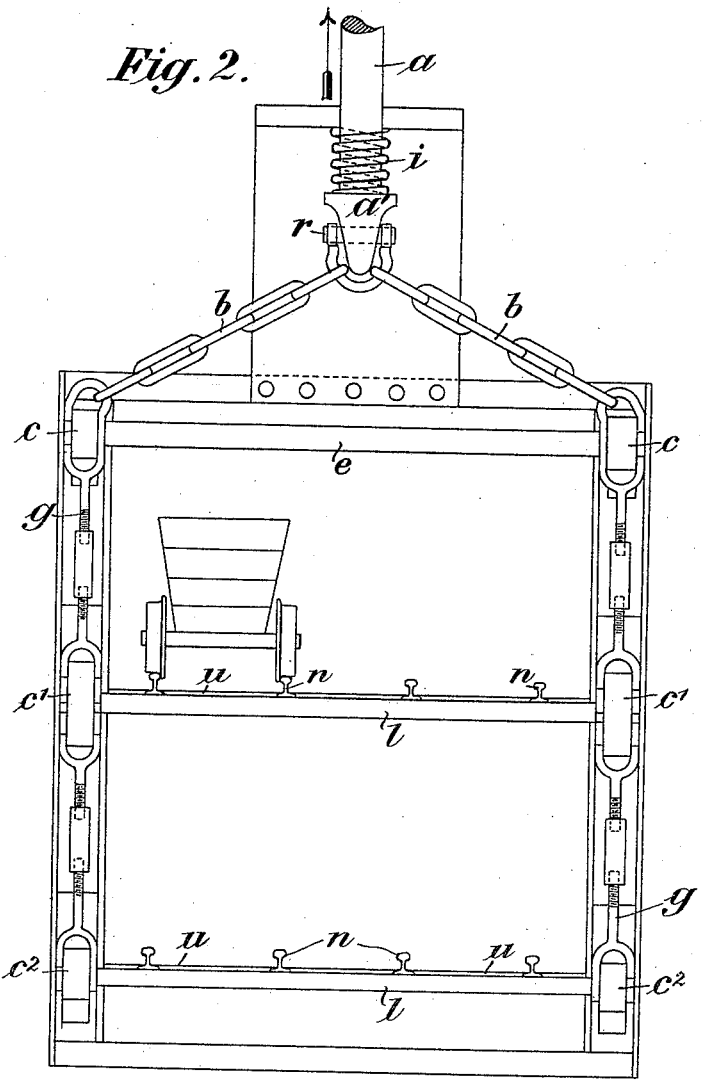
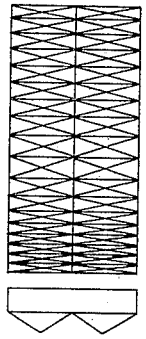
Witnesses:
Inventor:
Heinrich Baum
By Rudolph M. Lotz
Attorney.

(No Model.)

3 Sheets—Sheet 3.

H. BAUM.
SAFETY DEVICE FOR ELEVATORS.

No. 604,557. Patented May 24, 1898.

Witnesses:
Wm B Snowhook
Erwin J Lotz

Inventor:
Heinrich Baum
By Rudolph M Lotz
Attorney

UNITED STATES PATENT OFFICE.

HEINRICH BAUM, OF DUDWEILER, GERMANY.

SAFETY DEVICE FOR ELEVATORS.

SPECIFICATION forming part of Letters Patent No. 604,557, dated May 24, 1898.

Application filed January 4, 1898. Serial No. 665,540. (No model.)

*To all whom it may concern:*

Be it known that I, HEINRICH BAUM, locksmith, a subject of the Emperor of Germany, residing at Dudweiler, Kreis Saarbrück, in the Empire of Germany, have invented certain new and useful Improvements in Safety Devices for Elevators; and I do hereby declare the following to be a full, clear, and exact description of the invention, such as will enable others skilled in the art to which it appertains to make and use the same.

My invention relates to a novel construction in a safety device for elevators, the object being to provide a device which will automatically prevent the cage of an elevator from dropping when the cable breaks; and it consists in the features of construction and combinations of parts hereinafter fully described and claimed.

Figure 1:
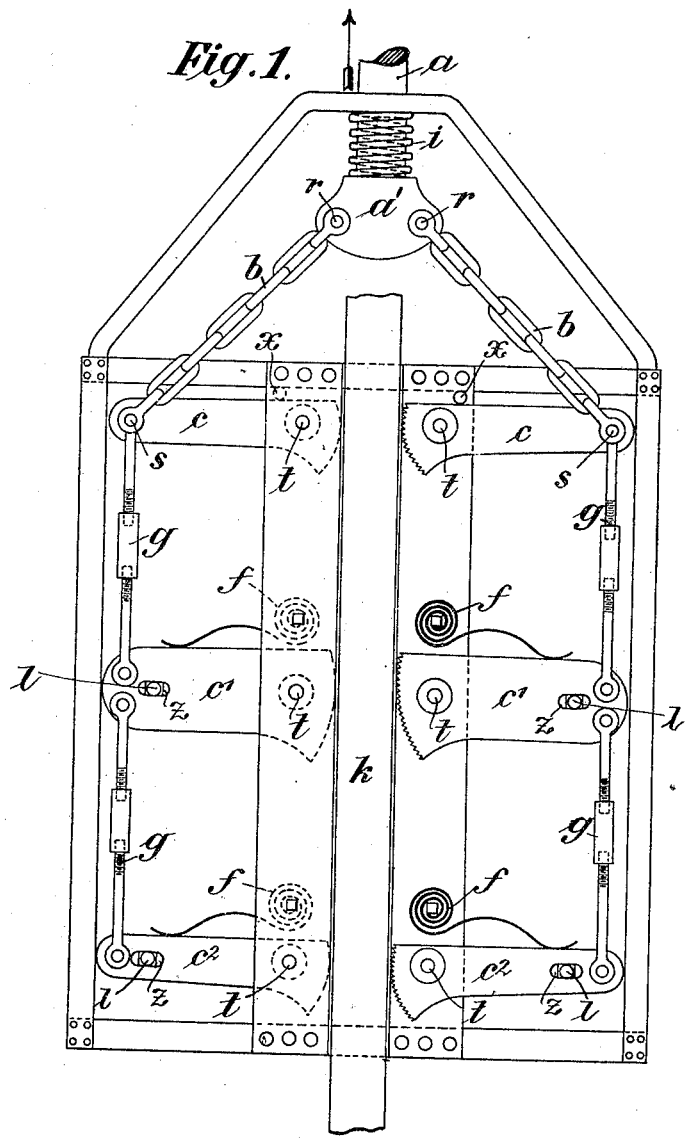
Figure 4:
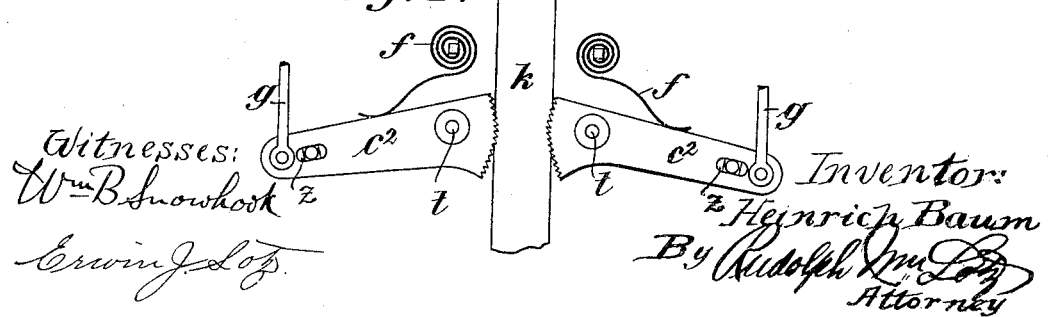
Figure 3:
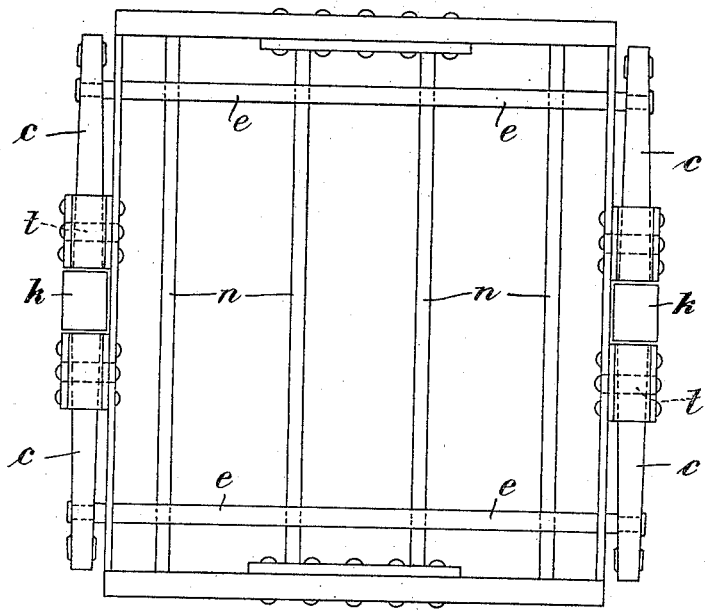

In the accompanying drawings, illustrating my invention, Figure 1 is a side elevation of an elevator-cage provided with my devices for preventing the same from falling and showing one of the guides for same in elevation. Fig. 2 is a side elevation of the cage at an angle of ninety degrees to Fig. 1. Fig. 3 is a plan view of the cage. Fig. 4 is a detail view showing the safety-clutches in position to clutch the guides. Fig. 5 is a detail view showing the toothed face of one of the clutches.

Referring now to said drawings, $a$ indicates the shank of the draft-head of the cage, to which cables (which I have not shown) are secured. A head $a'$ is mounted on the lower end of said shank $a$ and is connected with links $g$ and the ends of lever $c$ by means of chains $b$, secured at their upper ends to loops secured to said head $a'$ by means of bolts $r$. The links $g$, which consist of sleeve-bolts, connect the levers $c$ with the levers $c'$ and $c^2$. All of said levers are pivoted at their inner ends to lugs $t$ on the guide-bars of the cage adjacent the guide $k$ of the elevator-shaft and are provided at their inner ends with eccentric toothed faces, as shown in Fig. 4, which are adapted to firmly engage said guides $k$ when said levers assume the position shown in Fig. 4. Flat springs $f$ bear upon the rear ends of said levers $c'$ and $c^2$ and serve to depress said rear ends of said levers when same are released by the parting of the cables from which said cage depends. A spring $i$ is interposed between the upper end of said head $a'$ and the arch-bar of the cage through which the shank $a$ passes. The said spring $i$ has the effect of depressing said head $a'$ as soon as the cable parts, thus relieving the tautness of the chains $b$ and permitting the outer ends of the levers $c$, $c'$, and $c^2$ to be depressed, thus throwing the eccentric ends of the levers into engagement with the guide $k$, which is thus firmly clutched by said levers, thus preventing said cage from dropping. To hold said levers $c$, $c'$, and $c^2$ normally in the position shown in Fig. 1, I provide lugs $x$ on the guide-bars of the cage immediately above said levers $c$, against which the latter normally abut. The ends of the levers $c$, on opposite sides of the cage, are connected by means of cross-rods $e$, which serve to prevent the chains $b$ from drawing said ends of said levers inwardly. To still further insure the operation of said levers $c$, $c'$, and $c^2$ in case of accident, I have provided slots $z$ in said levers $c'$ and $c^2$, in which the ends of beams $l$, supporting the rails $n$, are mounted, so that the weight of the beams and rails and cars on said rails will further act to depress the ends of said levers and cause the same to more firmly embed themselves into the guides $k$.

I claim as my invention—

A safety device for elevators comprising levers pivotally mounted on the cage and provided with serrated eccentric ends adapted to engage the guides in the elevator-shaft, connection between the outer ends of said levers and the cables supporting said cage to hold said levers normally out of engagement with said guides of said shaft, and connection between said outer ends of said levers and the load-carrying devices of said cage whereby the strain is adapted to be transferred from said cables to said levers when said cables part to throw said eccentric ends of said levers into engagement with said guides of said shaft, substantially as described.

In testimony whereof I affix my signature in presence of two witnesses.

HEINRICH BAUM.

Witnesses:
CHAS. H. DAY,
HENRY HASPER.